(12) United States Patent
Zhang

(10) Patent No.: US 10,100,717 B2
(45) Date of Patent: Oct. 16, 2018

(54) INTAKE PORT FOR GENERATING HIGH TUMBLE AND SWIRL

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 87 days.

(21) Appl. No.: 15/239,672

(22) Filed: Aug. 17, 2016

(65) Prior Publication Data
US 2018/0051623 A1    Feb. 22, 2018

(51) Int. Cl.
*F02B 31/06*   (2006.01)
*F02D 9/02*    (2006.01)

(52) U.S. Cl.
CPC ............ *F02B 31/06* (2013.01); *F02D 9/02* (2013.01)

(58) Field of Classification Search
CPC ...... F02B 31/06; F02B 2275/48; F02B 23/08; F02D 9/02; F02D 2041/0015; F02D 41/0002; Y02T 10/146; Y02T 10/125; F01L 3/06; F01L 3/20; F01L 3/22; F16K 1/36
See application file for complete search history.

(56) References Cited

U.S. PATENT DOCUMENTS

| | | | | |
|---|---|---|---|---|
| 3,875,921 | A * | 4/1975 | Deboy | F01L 3/20 123/188.1 |
| 4,159,704 | A * | 7/1979 | Wiknich | F01L 3/20 123/188.16 |
| 4,309,969 | A | 1/1982 | Matthes | |
| 4,539,954 | A | 9/1985 | Klomp | |
| 5,474,044 | A * | 12/1995 | Matterazzo | F02B 23/08 123/306 |
| 6,679,219 | B1 * | 1/2004 | Pacinelli | F01L 3/06 123/188.3 |
| 7,513,231 | B2 | 4/2009 | Ezaki et al. | |

FOREIGN PATENT DOCUMENTS

JP      07324608 A  * 12/1995
JP      2006233815 A *  9/2006

OTHER PUBLICATIONS

JP 2006233815 A—English Translation.*
JP 07324608 A—English Translation.*

* cited by examiner

*Primary Examiner* — Joseph Dallo
*Assistant Examiner* — Scott A Reinbold
(74) *Attorney, Agent, or Firm* — Julia Voutyras; McCoy Russell LLP

(57) ABSTRACT

Methods and systems are provided for generating tumble in intake air by creating an asymmetrical annulus opening for flowing intake air into a combustion chamber of an engine cylinder. The asymmetrical annulus opening may be created by changing an angle of an intake valve disc of an intake valve. The angle of the intake valve disc may be varied based on engine operating parameters by extending or retracting one or more connect rods coupled to an annulus tumble guide movably housed inside an annulus channel.

20 Claims, 8 Drawing Sheets

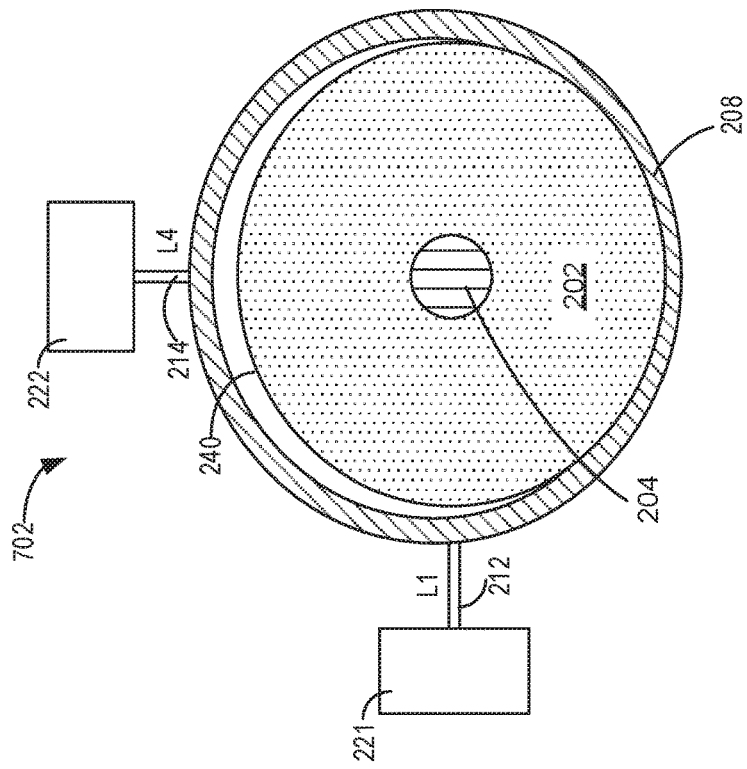
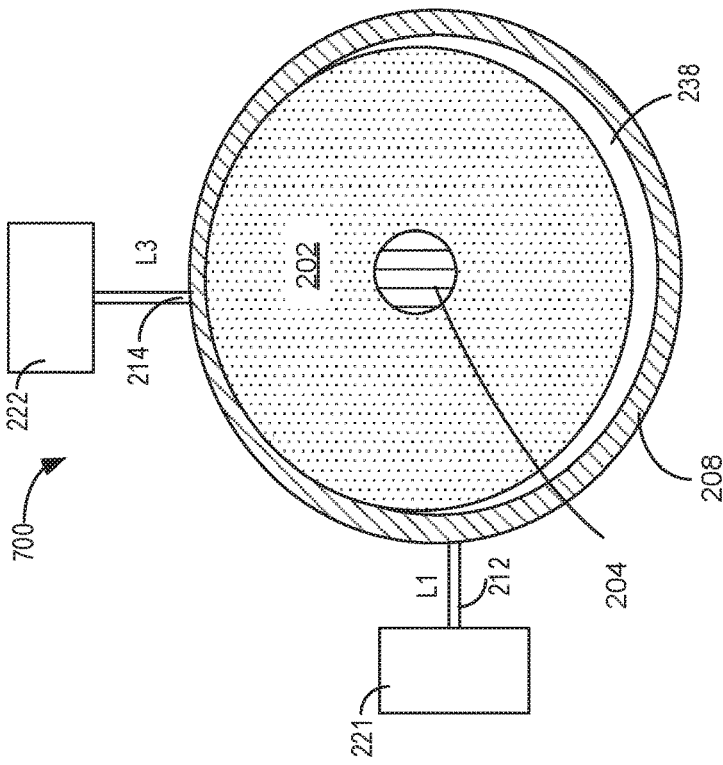

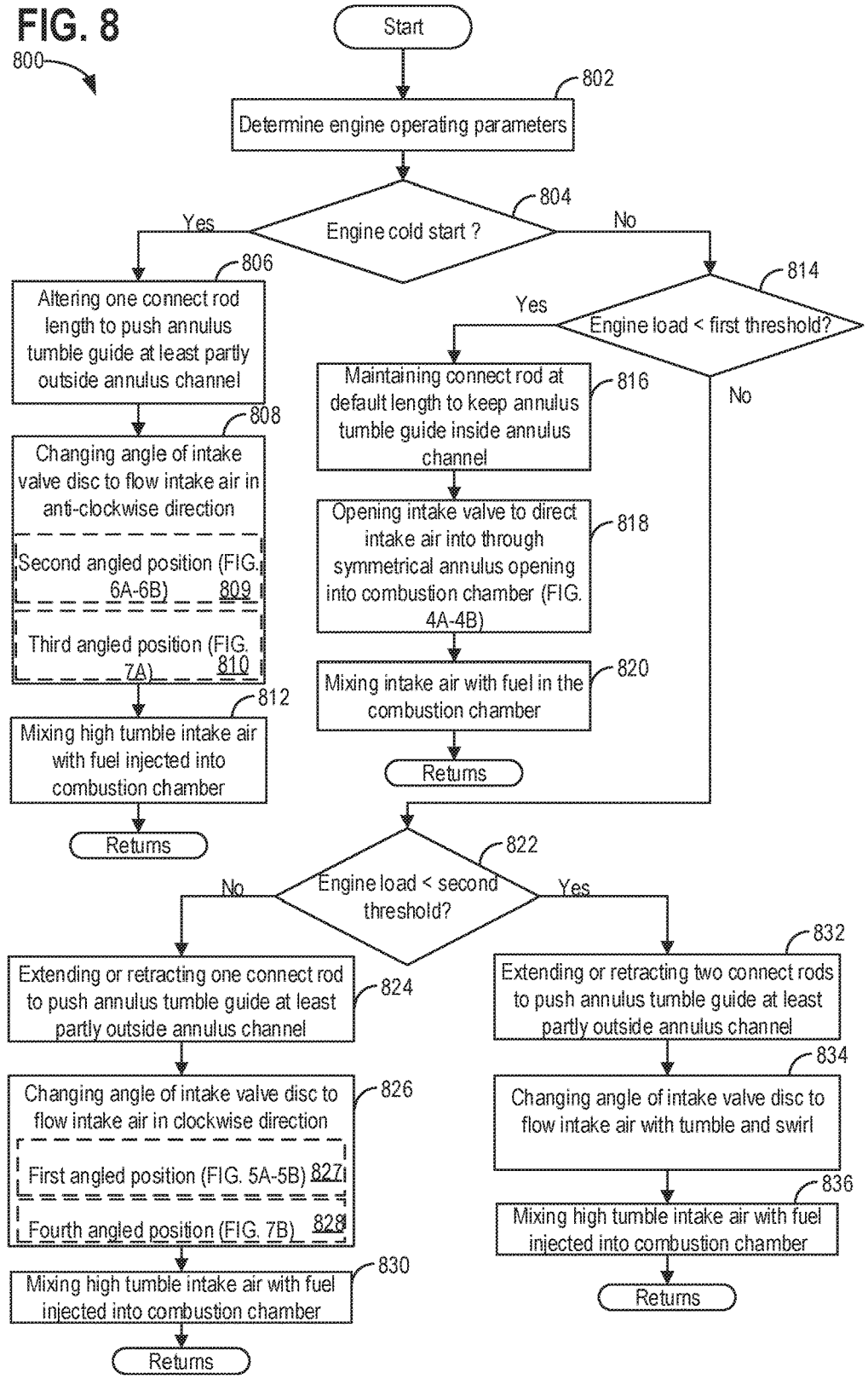

INTAKE PORT FOR GENERATING HIGH TUMBLE AND SWIRL

FIELD

The present description relates generally to methods and systems for generating tumble and swirl in intake air flowing into a combustion chamber of a vehicle engine.

BACKGROUND/SUMMARY

Distribution of an air-fuel mixture in a combustion chamber of an internal combustion engine at the time of ignition closely relates to engine performance and emission quality, in particular emission of unburned hydrocarbons, carbon monoxide, and particles. During direct fuel injection, a tumble flow, wherein a vortex is created in a vertical plane of the cylinder, and a swirl flow wherein a vortex is created in a horizontal plane of the cylinder may be introduced to accelerate and assist air-fuel mixture formation in the combustion chamber of the cylinder. The air-fuel mixture may distribute extensively throughout the entire combustion chamber due to the tumble and swirl generated, thereby promoting combustion. Enhancing tumble and swirl ensures fuel availability near a source of ignition, such as a spark plug, which improves combustion efficiency, fuel economy, and power output of the engine.

Other attempts to generate adequate tumble and swirl include a variable intake port geometry to obtain the desired tumble and swirl of the intake air. The variable intake port geometry may include the use of a baffle or shroud in or adjacent the inlet port and the use of a baffle or deflector on the intake valve. Swirl-generating intake ports with various forms of valves, flap valves, vanes, or other devices may also vary the intake port configuration. In one example approach shown in U.S. Pat. No. 4,309,969, a backside of an intake valve includes a rim shroud, directional vanes, and a semi-circular disc fixed to a top edge of the directional vanes. The resulting intake port configuration may generate the desired tumble and swirl in the intake air based on engine operating parameters.

However, the inventors herein have recognized potential issues with such systems. As one example, the adjustment mechanism of valves and vanes to introduce swirl is cumbersome and expensive. Moreover, the structural modification of the intake port may restrict flow, especially during full throttle conditions, which may lead to significant pressure drop. Further, soot may accumulate on the baffle or shrouds, on the valve mechanics, and/or on the vanes, which may cause degradation.

In one example, the issues described above may be addressed by a tumble guide movably housed in a channel of a cylinder head directly below a valve seat configured to interface with an intake valve, and an actuator configured to move the tumble guide to establish contact with an intake valve disc of the intake valve to change an angle of the intake valve disc.

In one example, the tumble guide may be an annulus tumble guide housed in an annulus channel, and a connect rod may couple the annulus tumble guide to the actuator. At a default length of the connect rod, the annulus tumble guide may be fully housed inside the annulus channel, and an opening fluidically connecting an intake port to the combustion chamber may be symmetrical.

The length of the connect rod may be increased or decreased away from the default length to change an angle of the intake valve disc. For example, at an extended length of the connect rod, a first segment of the annulus tumble guide may protrude at least partly out of the annulus channel towards the intake valve disc. The first segment of the annulus tumble guide may come in contact with the intake valve disc when the intake valve is actuated to an open position, changing the angle of the intake valve disc to create a first asymmetrical opening around the intake valve disc. Similarly, at a retracted length of the connect rod, the first segment of the annulus tumble guide moves further back into the annulus channel, away from the intake valve disc, and a second segment of the annulus tumble guide, opposite the first segment, protrudes at least partly outside the annulus channel towards the intake valve disc. The second segment of the annulus tumble guide may come in contact with the intake valve disc when the intake valve is actuated to an open position, changing the angle of the intake valve disc to create a second asymmetrical opening around the intake valve disc.

In this way, changing the angle of the intake valve disc by extending or retracting the connect rod coupled to the annulus tumble guide creates an asymmetrical opening from the intake port to the combustion chamber. The angle of the intake valve may be regulated based on engine operating conditions, for example based on engine load and engine cold start conditions. Introducing intake air through the asymmetrical opening into the combustion chamber may generate desired tumble depending on engine operating parameters. The tumble and swirl generated may enhance fuel combustion, thereby enhancing fuel economy and improving emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7A and 7B illustrate top views of the intake valve of FIG. 2 with the tumble guide in a third and a fourth tumble generating position, respectively.

FIG. 8 shows an example method for generating tumble in intake air.

DETAILED DESCRIPTION

Figure 1:
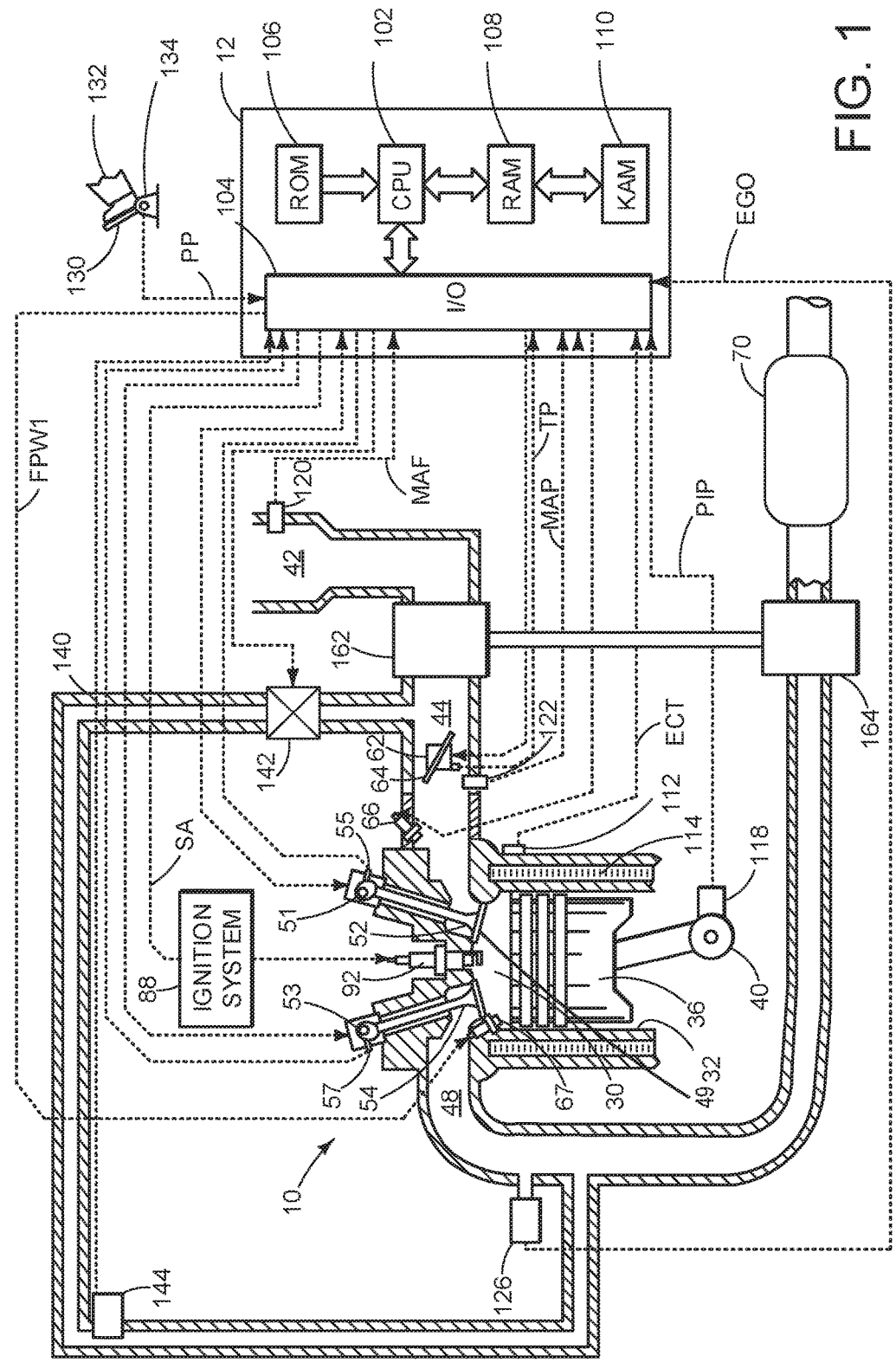
FIG. 1 shows an engine system of a vehicle.
Figure 2:
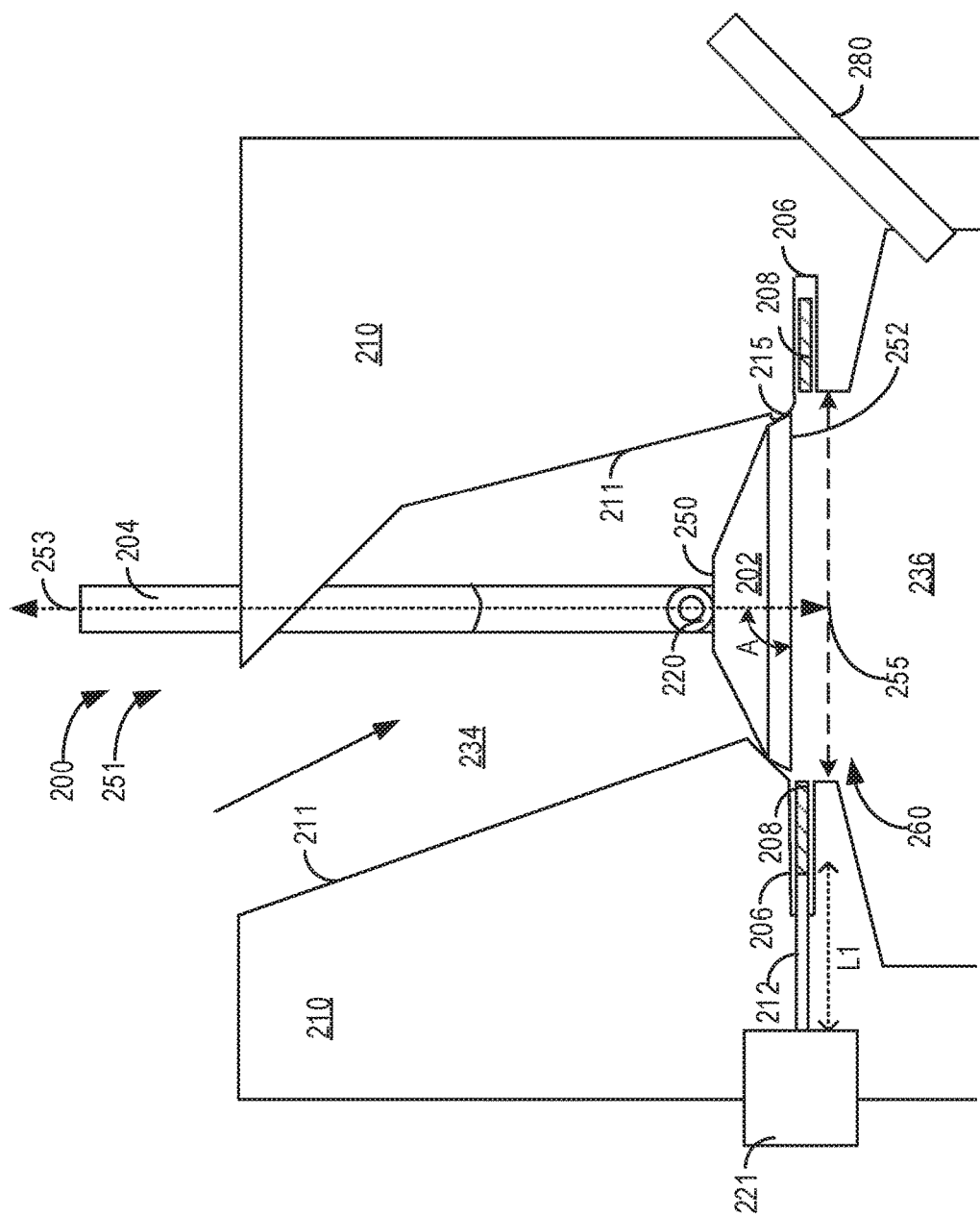
FIG. 2 shows a side view of an intake valve in a closed position along an intake port including a tumble guide.

The following description relates to systems and methods for generating tumble and swirl in intake air flowing through an intake port to a combustion chamber of an internal combustion engine system. FIG. 1 shows an example engine system comprising an intake valve for regulating flow of intake air into a combustion chamber of a cylinder of the engine. The formation of the air-fuel mixture in the combustion chamber may be controlled by regulating an angle of an intake valve disc by an annulus tumble guide while opening the intake valve. FIG. 2A shows an embodiment of an intake valve along with an annulus tumble guide for regulating the angle of an intake valve disc by extending or retracting one or more rods coupled to the annulus tumble guide. The symmetry of the intake airflow path around the intake valve and through the opening directing intake air from the intake port into the combustion chamber may depend on the position of the annulus tumble guide relative to the intake valve disc. FIGS. 2A, 4A, 5A, and 6A illustrate side views and FIGS. 3, 4B, 5B, 6B, 7A and 7B illustrate top views of the relative position of the annulus tumble guide and the intake valve disc during various positions of the tumble guide and intake valve (closed position, open position, or angled open positions). For a specific engine operating conditions, the desired tumble and swirl may be generated by regulating the angle of the intake valve disc, which in turn defines the symmetry of the opening directing intake air into the combustion chamber. FIG. 8 demonstrates an example method for generating tumble in intake air flowing through an intake valve illustrated in FIG. 2 based on engine operating parameters.

To ensure adequate mixing of intake air with fuel during combustion, tumble and swirl may be generated in the intake air to enhance air and fuel mixing to initiate combustion. To enhance air-fuel mixing, an angle of an intake valve disc may be altered while opening the intake valve to flow intake air into the combustion chamber. Depending on the angle of the intake valve disc, an opening of the intake port into the combustion chamber may be symmetrical or asymmetrical. In a symmetrical opening, the intake port may have uniform fluidic connection to the combustion chamber around an entire outer circumference of the intake valve disc when the intake valve is in an open position. In contrast, in an asymmetrical opening, the intake port may fluidically connect to the combustion chamber around certain sections of the outer circumference of the intake valve disc, while the intake port may have no fluidic connection or limited fluidic connection to the combustion chamber around other sections of the outer circumference of the intake valve disc when the intake valve is open. The symmetry of the opening connecting the intake port to the combustion chamber may determine the tumble and swirl generated in the intake air flowing through the opening.

In one example, an annulus tumble guide coupled to one or more connect rods may be used to generate tumble in intake air flowing from an intake port to the combustion chamber. The position of the annulus tumble guide in relation to an intake valve disc of intake valve may be altered depending on engine operations. The length of the one or more connect rods may be varied to push out and/or to retract different segments of the annulus tumble guide from an annulus channel around an inner wall of an intake port below an intake valve seat. Depending on engine operating parameters, the segment of the annulus tumble guide protruding out of the annulus channel may change an angle of the intake valve disc as the intake valve is being opened, creating an asymmetrical opening for flowing intake air into the combustion chamber. The asymmetrical opening may generate tumble and swirl in the intake air flowing through the opening without any additional tumble generating apparatus, such as swirl vanes or baffles coupled to the intake valve and/or to the intake port.

FIGS. 1-7B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a schematic diagram illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Intake passage 42 or intake manifold 44 may flow intake air downstream of the throttle plate 64 to an inlet opening of each cylinder in the multi-cylinder engine. The intake valve 52 may regulate flow of intake air to the combustion chamber 30, and a position of the intake valve 52 may be controlled by controller 12 via electric valve actuator (EVA) 51. In one example, an angle of an intake valve disc 49 of the intake valve 52 may be altered to generate desired tumble and swirl in the intake air flowing through the intake valve to the combustion chamber. The angle of the intake valve disc 49 may be regulated through an actuator regulated annulus tumble guide, wherein the position of the annulus tumble guide may be altered based on engine operating parameters by the controller 12.

The exhaust valve 54 may be coupled to exhaust passage 48 and controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 67 is shown coupled directly to combustion chamber 30 for injecting fuel directly therein in proportion to the pulse width of signal FPW1 received from controller 12. In this manner, fuel injector 67 provides what is known as direct injection of fuel into combustion chamber 30. The fuel injector may be mounted in the side of the combustion chamber or in the top of the combustion chamber, for example. Additionally, fuel injector 66 is shown coupled directly to the intake passage for injecting fuel upstream of intake valve 52. In this manner, fuel injector 66 provides what is known as port injection of fuel into combustion chamber 30. Fuel may be delivered to fuel injectors 67 and 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Further, in the disclosed embodiments, an exhaust gas recirculation (EGR) system may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature), and the crank speed sensor. Further, the EGR flow may be controlled based on an exhaust $O_2$ sensor and/or an intake oxygen sensor (intake manifold). Under some conditions, the EGR system may be used to regulate the temperature of the air and fuel mixture within the combustion chamber and/or the temperature proximate PF 72. While FIG. 1 shows a high pressure EGR system, a low-pressure EGR system may additionally, or alternatively, be used. In a low-pressure EGR system, EGR may be routed from downstream of a turbine of a turbocharger to upstream of a compressor of the turbocharger.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 1, one or more of these sensors may be omitted and/or moved.

Controller 12 is shown in FIG. 1 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from sensor 122. The controller 12 employs the various actuators of FIG. 1 to adjust engine operation based on the received signals and instructions stored on a memory of the controller. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor 102 for performing the methods described herein, as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

FIG. 2 illustrates a side view of an intake port 234 defined by a wall 211 of a cylinder head 210. An intake valve 200 including an intake valve disc 202 coupled to a push rod 204 extends along the intake port 234 towards a combustion chamber 236. The intake valve 200 and the combustion chamber 236 may be non-limiting examples of the intake valve 52 and the combustion chamber 30 of FIG. 1. In addition to the intake valve 200, an exhaust valve, (such as the exhaust valve 54 of FIG. 1) and fuel injector (such as the fuel injector 67 for FIG. 1 for direct injection) may each open onto the combustion chamber. In another example, the fuel injector may inject fuel into the intake passage (port injections), for example, the fuel injector 66 of FIG. 1, which may then be directed to the combustion chamber along with intake air. In one example, more than one intake valve may be coupled to the combustion chamber of each cylinder of the engine.

A fuel injector 280 may be coupled to the combustion chamber for delivering fuel directly to the combustion chamber 236. In one example, the fuel injector 280 may be positioned to the right of the intake valve, as illustrated in FIG. 2, when viewing the engine installed in the vehicle from the front. In other examples, the position of the fuel injector may be on the left of the intake valve.

The intake valve 200 is illustrated in a closed position 251 in FIG. 2. The intake valve disc 202 when in contact with a valve seat 215 along the cylinder head 210 may block the fluidic connection of the intake port 234 with the combustion chamber 236, thereby closing the intake valve, and preventing the flow of intake air from the intake port 234 to the combustion chamber 236, as illustrated in FIG. 2. Conversely, intake air flowing in through the intake port may be introduced into the combustion chamber 236 by opening the intake valve 200, as will be discussed below with reference to FIGS. 4A-7B.

The intake valve disc 202 may include a bottom surface 252 facing the combustion chamber. When the intake valve is in the closed position, the bottom surface 252 may be parallel to a longitudinal axis 255 of an opening 260 of the combustion chamber 236. A top surface 250, opposite the bottom surface 252 of the intake valve disc 202, may face the intake port and face away from the combustion chamber 236. In one example, the top surface 250 may slope downwards towards the bottom surface 252 such that the intake valve disc has a conical configuration, as illustrated in the side view in FIG. 2. In other example, the configuration of the tops surface relative to the bottom surface 252 may be different, for example, configured to make the intake valve disc oval, circular, rectangular etc.

In FIG. 2, the bottom surface 252 of intake valve disc 202 is parallel to the longitudinal axis 255 of the opening 260 of the combustion chamber 236 and is perpendicular to a longitudinal axis 253 of the push rod 204. The top surface 250 of the intake valve disc 202 may be coupled to a pivoting mechanism 220 at a base of the push rod 204. In one example, the pivoting mechanism may include a hinge joint at the base of the push rod coupling with the intake valve disc. In another example, the pivoting mechanism 220 may be a ball joint coupling the push rod 204 to the intake valve disc 202. The pivoting mechanism 220 may change an angle A between the bottom surface 252 and the longitudinal axis 253. The pivoting mechanism 220 may allow the intake valve disc to pivot in any direction. In some examples, the range of movement at the pivoting mechanism may be limited, for example, the angle A may not be less than 15° relative to the longitudinal axis 253. In other examples, the pivoting mechanism may provide relatively unlimited range of movement. A mechanism for enabling angular movement of the intake valve disc will be discussed below.

In addition to angular movement of the intake valve disc 202, the push rod 204 coupled to the intake valve disc 202 may move the intake valve disc in a downward direction (that is, towards the combustion chamber 236 while opening the valve to allow intake airflow from the intake port to the combustion chamber) or in an upward direction (that is, away from the combustion chamber 236 towards the intake port while closing the valve).

The push rod 204 may be coupled to an actuator (for example, an electric actuator or a cam of a camshaft). The upward/downward movement of the push rod, and hence, of the coupled intake valve disc may be regulated by the actuator. The actuator may actuate the push rod and the coupled intake valve disc 202 to move downwards into the combustion chamber at the start of an intake stroke of an engine cycle and may move the push rod with the intake valve disc away from the combustion chamber at the end of the intake stroke, thereby opening and closing the intake valve respectively. The upwards and downward movement of the intake valve disc along with the angular movement of the intake valve disc at the pivoting mechanism 220 defines the opening of the intake port 234 to the combustion chamber 236, and will be discussed further with reference to FIGS. 4A-7B.

A mechanism for enabling angular movement of the intake valve disc may include an annulus tumble guide 208 that may be movably housed inside an annulus channel 206. The annulus channel 206 may be directly below the valve seat 215, around an inner circumference of the opening 260 of the combustion chamber. The annulus channel 206 may be along the cylinder head below the valve seat 215, without any intervening structures in the cylinder head between the annulus channel 206 and the valve seat 215. The relationship of the annulus tumble guide relative to the intake valve disc may be altered by moving the annulus tumble guide in or out of the annulus channel. A first rod 212 (illustrated in FIG. 2 and FIG. 3) and a second rod 214 (illustrated in FIG. 3) may be coupled to the annulus tumble guide 208. FIG. 2 illustrates the first rod 212 coupled to a first actuator 221. The first rod may be at a default length L1, such that the annulus tumble guide is maintained fully within the annulus channel along the circumference of the annulus channel 206. As used herein, "fully" within the annulus channel may include all portions of the tumble guide being contained within the annulus channel, such that no portions of the tumble guide protrude from the annulus channel into the opening. However, in some examples, fully within the annulus channel may include some of the tumble guide protruding out of the annulus channel and into the opening, so long as the tumble guide does not contact the intake valve disc at any point of the actuation of the intake valve.

Figure 3:
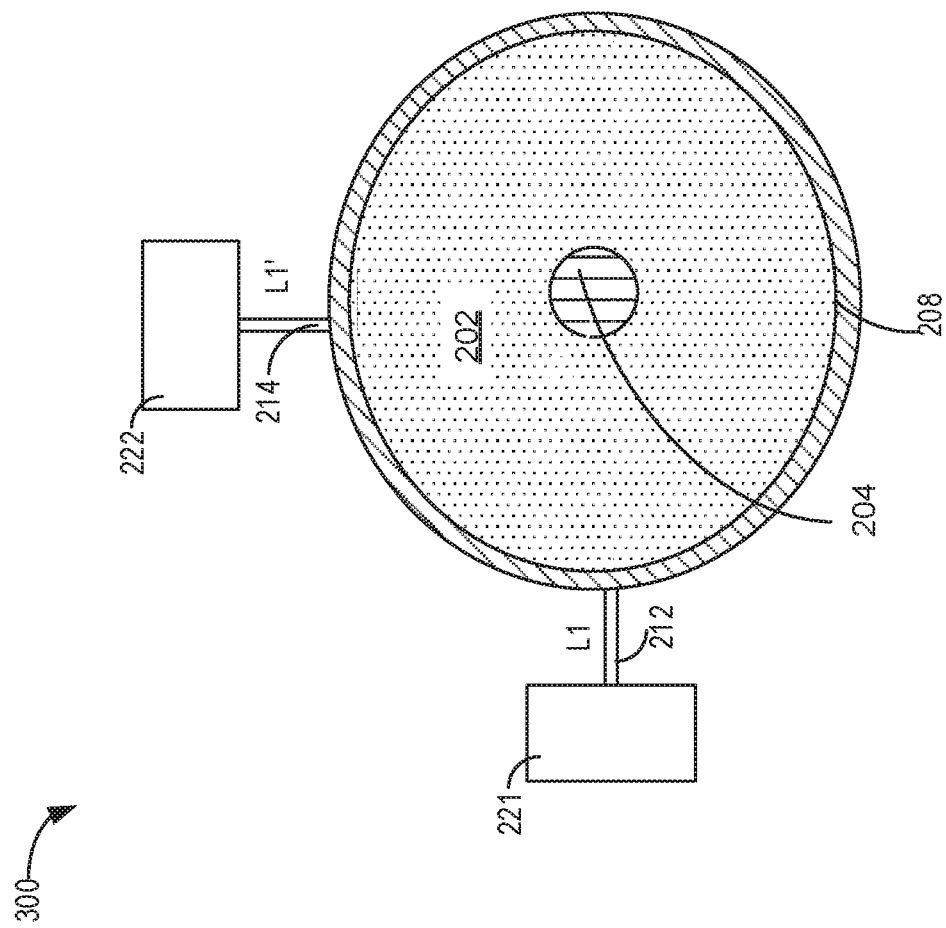
FIG. 3 shows a top view of the intake valve of FIG. 2.

A top view 300 of the intake valve disc in FIG. 3 shows the annulus tumble guide 208 in relation to the intake valve disc 202 coupled to the push rod 204. In the illustration in FIG. 3, the intake valve disc 202 is in closed position (the intake valve disc 202 is in contact with the valve seat 215 illustrated in the side view in FIG. 2). The first rod coupled to the first actuator 221 and the second rod 214 coupled to the second actuator 222 may each be at the default length of L1 and L1', respectively, thereby maintaining the annulus tumble guide 208 in the annulus channel, at a uniform distance from the intake valve disc 202 around the circumference of the intake valve disc. In one example, both the first rod and the second rod may be located along a first quarter of the circumference of the annulus tumble guide, as illustrated in the top view 300 of the intake valve 200.

The length of the first rod and/or the second rod may be changed by the first actuator or the second actuator depending on engine operating parameters, to protrude a segment of the annulus tumble guide from the annulus channel towards the intake valve disc. The protruding segment of the intake valve may come in contact with the bottom surface 252 of intake valve disc while opening the intake valve. The contact between the intake valve disc and the segment of the intake valve disc protruding out of the annulus channel may change an angle of the intake valve relative to the longitudinal axis 253 of the push rod 204. The flow path of intake air into the combustion chamber may be based on the angle of the intake valve disc and by the symmetry of the opening of the combustion chamber, as will be discussed below.

Figure 4A:
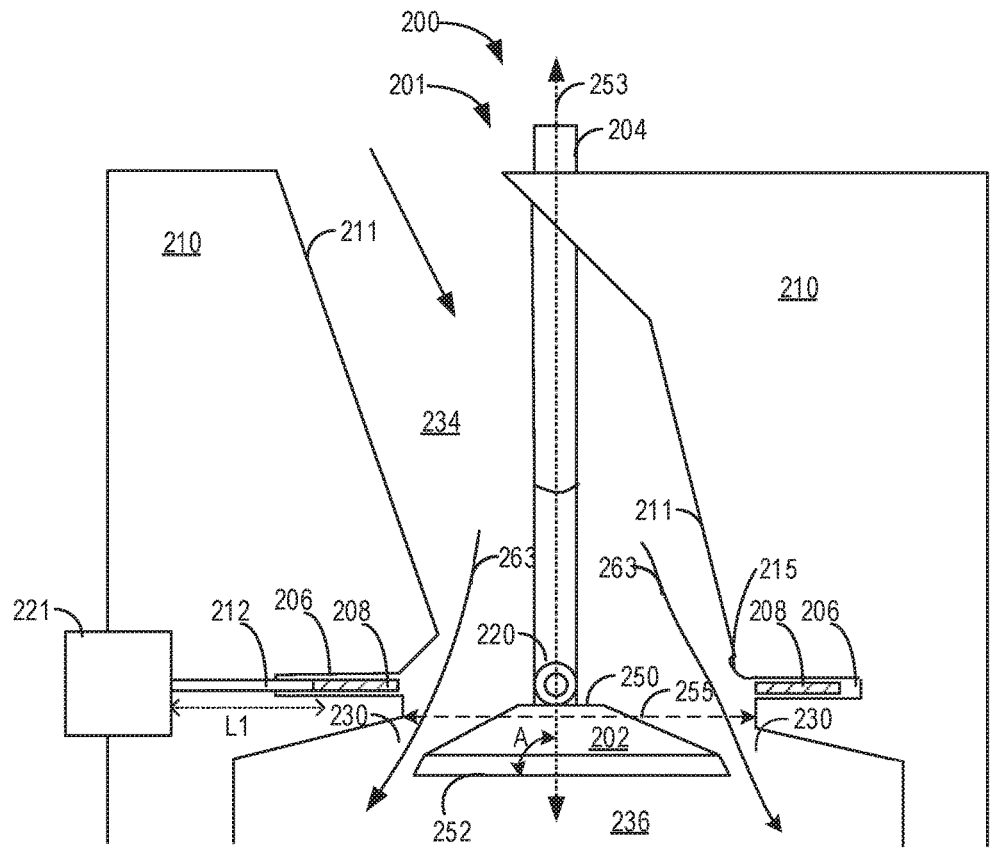
FIG. 4A shows the intake valve of FIG. 2 in an open position and the tumble guide in a non-tumble generating position.

FIG. 4A illustrates a side view of the intake valve 200 in an open position 201 where the intake valve disc 202 is positioned inside the combustion chamber 236, beyond the valve seat 215. The annulus tumble guide 208 is positioned inside the annulus tumble guide wherein the first rod is at the default length L1, such that the annulus tumble guide 208 is not extended beyond the annulus channel around the circumference of the annulus channel. Similarly, the second rod 214 (not visible) may also be at the default length L1', thereby not pushing the annulus tumble guide out of the annulus channel. The intake valve disc 202 is not angled, and as such the bottom surface 252 of the intake valve disc 202 may be parallel to the longitudinal axis 255 of the opening 260 of the combustion chamber and may be at the angle A (same as in the closed position 251 in FIG. 1) relative to the longitudinal axis 253, wherein angle A may be 90°.

When the intake valve disc is inside the combustion chamber beyond the annulus channel, and the intake valve disc is not angled, there may be a symmetrical gap 230 between the intake valve disc and the cylinder head. Intake air from the intake port 234 flows symmetrically through the symmetrical gap 230 into the combustion chamber 236. The intake valve disc is not angled, and hence, a baseline amount of tumble is generated in intake air flowing into the combustion chamber as illustrated by arrows 263, e.g., for a given intake air flow mass and/or velocity.

Figure 4B:
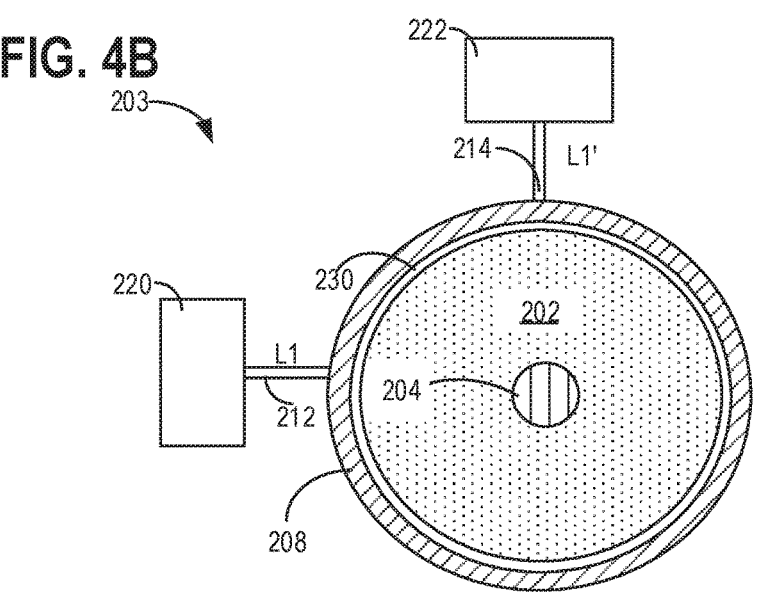
FIG. 4B shows a top view of the intake valve of FIG. 4A.

FIG. 4B illustrates a top view 203 showing the relative position of the intake valve disc 202 and the annulus tumble guide 208 during the open position of FIG. 4A. As the annulus tumble guide is inside the annulus channel and the intake valve is inside the combustion chamber beyond the annulus channel, the symmetrical gap 230 allows intake air from the intake port to flow uniformly/symmetrically to the combustion chamber 236, as illustrated in FIG. 4A. The symmetrical gap 230 is symmetrical (e.g., the gap be uniform along an entirety of the circumference of the intake valve disc) as the annulus tumble guide is not protruding out of the annulus channel along the circumference of the annulus channel and the intake valve disc is not angled.

Figure 5A:
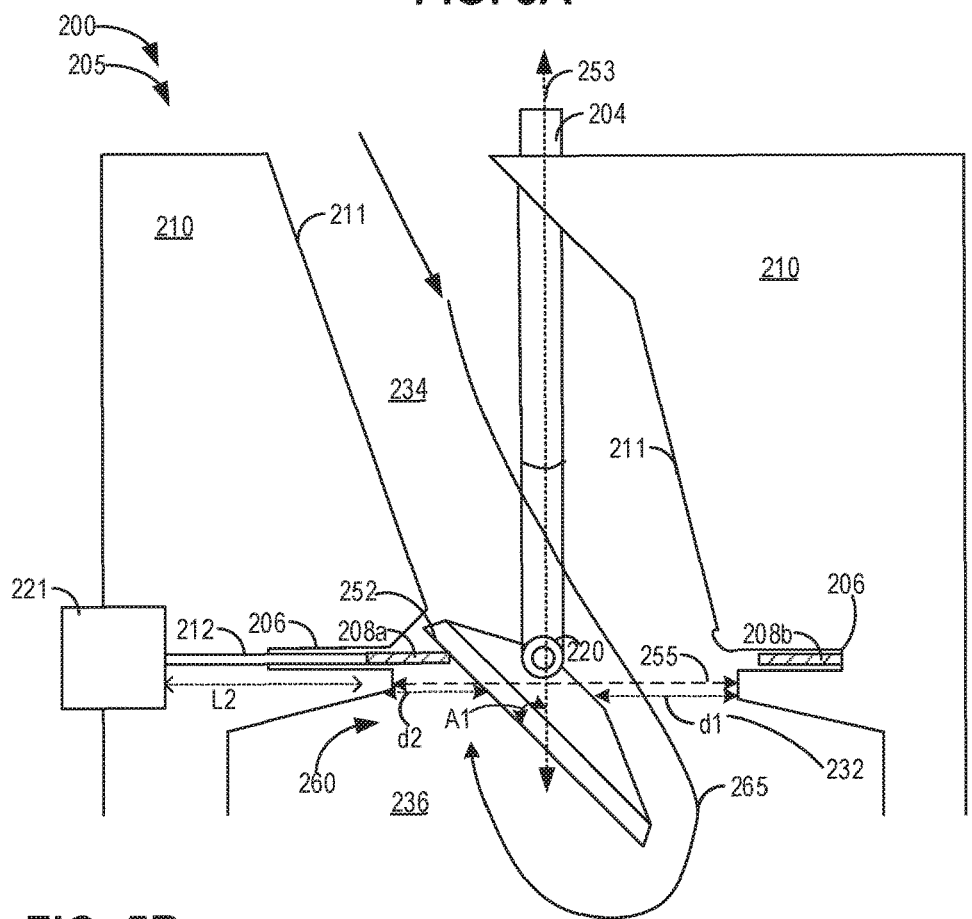
FIG. 5A shows the intake valve of FIG. 2 in the open position and the tumble guide in a first tumble generating position.

FIG. 5A illustrates a side view of the intake valve 200 in a first angled open position 205 where the intake valve disc 202 is positioned inside the combustion chamber 236, beyond the valve seat 215. The first rod is at an extended length L2, which is longer than the default length L1 (illustrated in FIGS. 2-4A), such that a first segment 208a of the annulus tumble guide 208 is extended beyond the annulus channel 206 while an opposite second segment 208b of the annulus tumble guide is pushed further back into the annulus channel 206. The first segment includes a first half of the annulus tumble guide, which may be coupled, to the first rod 212 and the second segment 208b is a second half of the annulus tumble guide opposite the first segment 208a. The first segment 208a may be half of annulus tumble guide 208 on the left side of a center axis 262 and the second segment 208b may be the opposite half of the annulus tumble guide 208 on the right side of the center axis 262, as illustrated in a top view in FIG. 5B.

The first segment 208a may protrude out of the annulus channel to a varying degree and consequently the second segment of the annulus tumble guide may move back further into the annulus channel to varying degrees along the circumference of the annulus channel. The second rod 214 (not visible in FIG. 5A, illustrated in FIG. 5B) may be at the default length L1', not pushing the annulus tumble guide out of the annulus channel.

Referring back to FIG. 5A, as the intake valve disc is moving downward towards the combustion chamber to open the intake valve 200, the bottom surface 252 may come in contact with the first segment 208a of the annulus tumble guide protruding out of the annulus channel. The intake valve disc 202 upon coming in contact with the annulus tumble guide pivots at the pivoting mechanism 220 such that the bottom surface 252 is at an angle A1 relative to the to the longitudinal axis 253, wherein the angle A1 may be less than 90°.

The degree of the angle A1 may vary depending on the extent of protrusion of the annulus tumble guide. The extent of protrusion may in turn depend on the length of the first rod. In a first example, the angle A1 may be 30° when the length of the first rod is maximum and hence, a protrusion of the annulus tumble guide is maximum too. In contrast, in a second example, the angle A1 may be 60° when the length of the first rod is less than in the first example and hence the protrusion of the annulus tumble guide may be less too.

The angle of the intake valve disc adjusts the opening 260 of the combustion chamber to form an asymmetrical gap 232 between the intake valve disc and the combustion chamber opening defined by the cylinder head 210. The asymmetrical gap 232 includes a first distance d1 between the intake valve disc and the cylinder head framing the combustion chamber opening, allowing fluidic communication between the intake port and the combustion chamber. In contrast, a second distance d2, between the intake valve disc and the cylinder head defining the opening 260 of the combustion chamber, may not allow any fluidic communication between the intake port and the combustion chamber. Intake air flows through the asymmetrical gap 232 into the combustion chamber in a clockwise direction, as indicated by an arrow 265. In one example, if the fuel injector 280 is positioned on the right of the intake valve, intake air flowing through the asymmetrical gap 232 may flow away from the fuel injector.

Figure 5B:
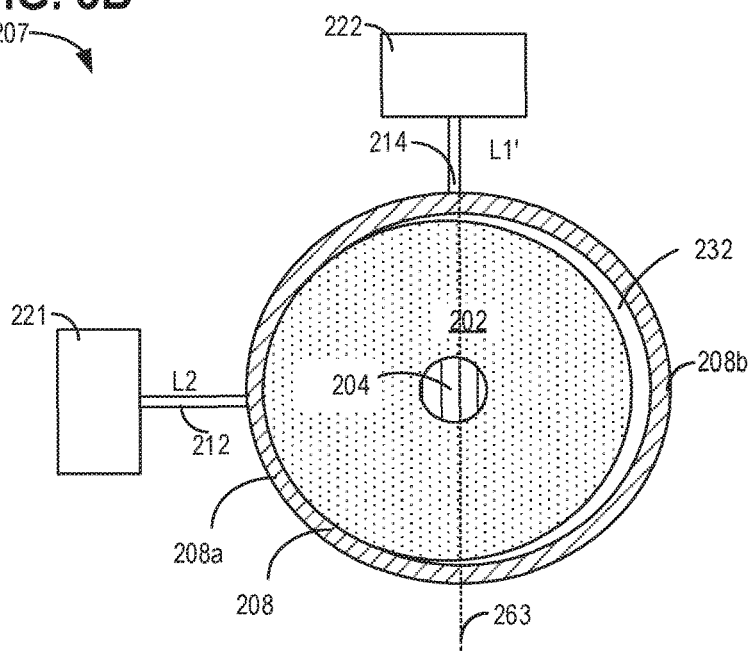
FIG. 5B shows a top view of the intake valve of FIG. 5A.

FIG. 5B illustrates a top view 207 showing the position of the intake valve disc 202 relative to the opening of the combustion chamber during the first angled position of FIG.

5A. As described above, the first segment of the annulus tumble guide 208 protrudes outside the annulus channel, and the intake valve disc is angled when opening the intake valve. The opening of the combustion chamber is adjusted to form the asymmetrical gap 232 by the angled position of the intake valve disc 202, which allows intake air from the intake port to flow to the combustion chamber 236, as described above.

Figure 6A:
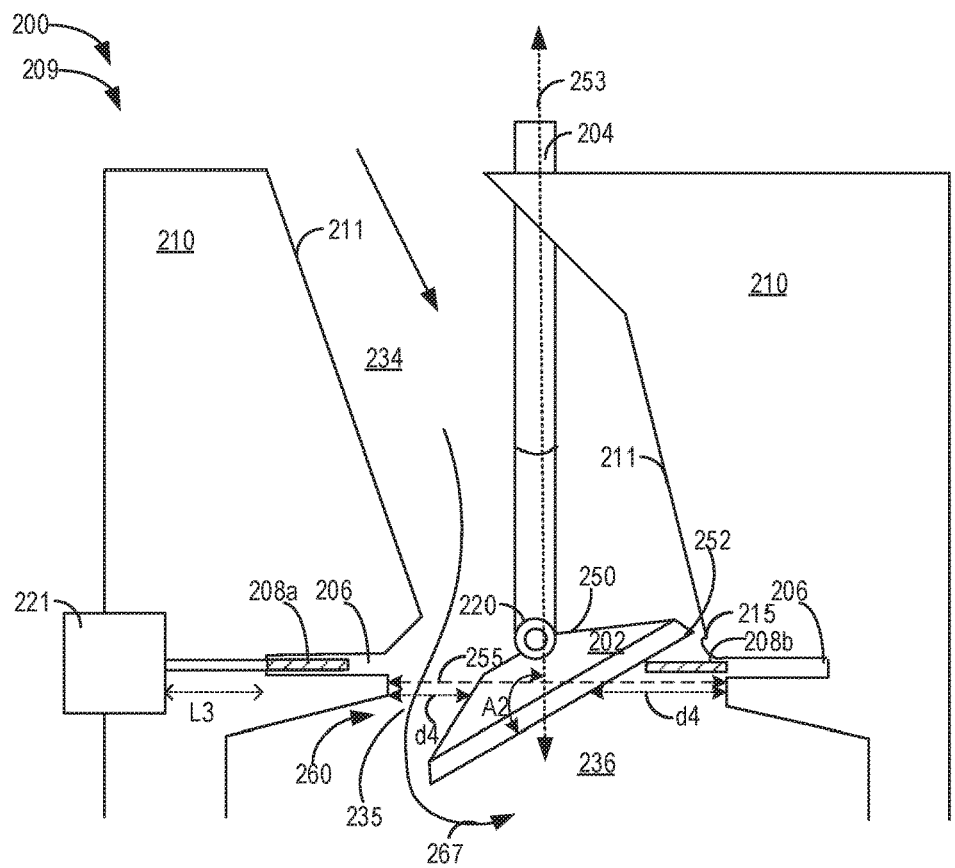
FIG. 6A shows the intake valve of FIG. 2 in the open position and the tumble guide in a second tumble generating position.

FIG. 6A illustrates a side view of the intake valve 200 in a second angled open position 209 where the intake valve disc 202 is positioned inside the combustion chamber 236, beyond the valve seat 215. The first rod is a retracted length L3, which is shorter than the default length L1 (illustrated in FIG. 4A), such that the first segment 208a of the annulus tumble guide 208 is pulled all the way inside the annulus channel 206 while an opposite segment of the annulus tumble guide is protruding outside the annulus channel. The second rod 214 (not visible in FIG. 6A, illustrated in FIG. 6B) may be at the default length of L1', not pushing the annulus tumble guide out of the annulus channel.

As the push rod 204 moves the intake valve disc downwards to open the intake valve 200, the bottom surface 252 of the intake valve disc 202 may come in contact with the second segment 208b of the annulus tumble guide protruding out of the annulus channel. The intake valve disc 202 upon coming in contact with the annulus tumble guide pivots along the pivoting mechanism 220 such that the bottom surface 252 is at an angle A2, wherein A2 is more than 90° relative to the longitudinal axis 253, as illustrated in FIG. 6A. The degree of the angle A2 of the intake valve disc relative to the longitudinal axis 253 may depend on the extent of protrusion of the annulus tumble guide, which in turn depend on the length of the first rod. In a first example, the angle A2, may be 160° when the length L3 of the first rod is minimum and hence, the protrusion of the second segment of the annulus tumble guide is maximum. In contrast, in a second example, the angle A2 may be 110° when the length of the first rod is more than in the first example.

When the intake valve disc at an angle A2 relative to the longitudinal axis 253 and is inside the combustion chamber beyond the valve seat 215, the opening 260 of the combustion chamber is adjusted to form an asymmetrical gap 235 between the intake valve disc and the cylinder head defining the opening 260. The asymmetrical gap 235 includes a third distance d3 between the intake valve disc and the cylinder head defining the opening 260 of the combustion chamber, allowing fluidic communication between the intake port and the combustion chamber. In contrast, a fourth distance d4, between the intake valve disc and the cylinder head defining the opening of the combustion chamber may not allow any fluidic communication between the intake port and the combustion chamber. Intake air thus flows through the asymmetrical gap 235 into the combustion chamber in an anti-clockwise direction, as indicated by an arrow 267. If the fuel injector 280 is in on the right side of the intake valve, as illustrated in FIG. 2, the anti-clockwise flow of intake air is directed towards the fuel injector.

Figure 6B:
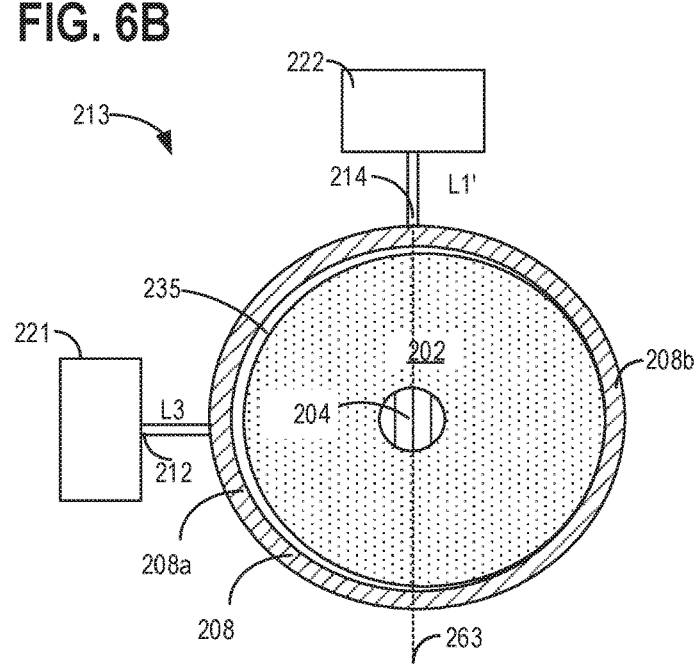
FIG. 6B shows a top view of the intake valve of FIG. 6A.

FIG. 6B illustrates a top view 213 showing the position of the intake valve disc 202 relative to the opening of the combustion chamber during the second angled position of FIG. 6A. As described above, the second segment of the annulus tumble guide protrudes outside the annulus channel, and the intake valve disc is angled when opening (inside the combustion chamber beyond the valve seat and the annulus channel). The asymmetrical gap 235 allows tumble and swirl generation in intake air flowing from the intake port to the combustion chamber 236, as illustrated in FIG. 6A.

FIG. 7A shows a top view with the intake valve disc 202 at a third angled position 700, and FIG. 7B shows a top view of the intake valve in a fourth angled position 702. During the third angled position, the first rod 212 is at the default length L1, not pushing the annulus tumble guide outside the annulus channel. However, the second rod 214 may be extended to a length L3, the length L3 longer than the default length L1' of the second rod 214. The extended length L3 of the second connect rod may push out the coupled segment 208 of the annulus tumble guide out of the annulus channel, while the opposite segment of the annulus tumble guide is pushed further back into the annulus channel. The protruding annulus tumble guide may angle the intake valve disc when it comes in contact with the bottom surface 252 of the intake valve disc while opening the intake valve. An asymmetrical gap 238 between the intake valve disc 202 and the cylinder head defining the opening of the combustion chamber is generated Intake airflows into the combustion chamber 236 with additional tumble and swirl in a clockwise direction through the asymmetrical gap 238. When the fuel injector is at the right side of the intake valve, as illustrated in FIG. 2, intake air flowing through the symmetrical gap 238 is directed away from the fuel injector.

When the second rod 214 is at a fully retracted length L4 which is less than the default length L1' of the second rod 214, a segment of the annulus tumble guide coupled directly to the second rod moves all the way back into the annulus channel 206 and consequently the opposite segment of the annulus channel moves out of the annulus channel, which may change the angle of the intake valve disc. During the fully retracted length of the second rod, as the intake valve opens, the segment of the annulus tumble guide protruding from the annulus channel comes in contact with the bottom surface 252, which angles the intake valve disc. The angled intake valve disc adjusts the opening of the combustion chamber defined by the cylinder head to form an asymmetrical gap 240, as illustrated in the top view in FIG. 7B. Intake air flows into the combustion chamber in an anti-clockwise direction through the asymmetrical gap 240.

Alternatively, both the first rod and the second rod may each be extended or retracted by a same length or by a different length at the same time, wherein each may protrude the annulus tumble guide towards the intake valve disc. The angle of the intake valve disc may be determined by the extent of protruding annulus tumble guide depending on the length of each of the first rod and the second rod. The length of the first rod and the second rod may be regulated by the respective actuators based on engine operating conditions, such as engine speed etc.

In one example, both the first rod and the second rod may be engaged (retracted and/or extended) at the same time. If both rods are extended at the same time, where the first rod is at a west position and the second rod is at a north position, the intake valve disc may be angled towards southeast direction, which means that the bottom surface of the intake valve disc will be vertically higher at a northwest direction and vertically lower at a southeast direction.

The default length of each of the first rod and the second rod may be the same or the defaults lengths may be different. In some examples, more than two rods may be coupled to the tumble guide, while in one other examples one rod may be coupled to the annulus guide.

In one example, the first rod and the second rod may include a plurality of telescoping segments, wherein the rods may be extended or retracted based on moving one or more telescoping segments to insert or to extend out of other telescoping segments. An actuator may regulate the relative movement of the plurality of telescoping segments based on engine operating conditions, such as engine load etc. In another example, the connect rods may include a plurality of folding collapsible segments, wherein one or more segments may be unfolded/extended to increase the length of the connect rods, and one or more segments may be folded and collapsed to retract the connect rods. In a further example, the connect rods may include one or more springs which may be compressed to retract the connect rods, or the compression force may be decreased/removed from the springs to extend the connect rods. In other examples, a different retraction and extension mechanism may be used for the first rod and the second rod.

Thus, as described above, an annulus tumble guide may be moved to either contact or not contact an intake valve disc during actuation of the intake valve, thus adjusting the angle of the intake valve disc relative to the push rod of the intake valve. In doing so, the amount of tumble and swirl generated in the intake air inducted into the cylinder may be adjusted. The annulus tumble guide may be comprised of an annular (e.g., ring-shaped) disc that is configured to surround the intake opening of the cylinder and be positioned in the cylinder head underneath the intake valve seat. One or more connect rods or other suitable structures may laterally adjust the position of the annulus tumble guide via a respective actuator.

The example tumble guide described above is one example of how the angling of the intake valve disc may be accomplished, but other configurations are possible without departing from the scope of the disclosure. For example, rather than being annulus, the tumble guide may be comprised of one or more rods or other structures that are directly coupled to an actuator. When the actuator moves the rod, it may protrude out into the cylinder and contact the intake valve disc as the intake valve is actuated. In such examples, intake air may still flow around an entirety of the intake valve, although more intake air may flow around certain regions of the intake valve than other regions when the valve disc is angled. In a further example, the tumble guide housed in the cylinder head under the valve seat may be dispensed with entirely and a mechanism may be present within the intake valve itself to angle the valve disc. For example, one or more adjustment rods may be present along or within the push rod, and an adjustment rod may be actuated (e.g., extended or otherwise pushed downward) to urge one side of the valve disc downward while the other side pivots upward.

In one example, where the fuel injector is mounted in the combustion chamber on the right side of the intake valve, under engine cold start conditions, the intake valve may be in the open position illustrated in FIGS. 6A-6B. The intake valve in the open position may provide ant-clockwise tumble in intake air entering the combustion chamber, which brings more vaporized fuel towards the spark plug and enhances air fuel mixing during intake fuel injection to reduce HC emission and engine misfire. In contrast, under engine full load condition, the intake valve may be in the open position illustrated in FIGS. 5A-5B. Intake air will flow in a clockwise direction to reduce fuel spray wall impingement and to enhance air-fuel mixing. Under partial load condition, both the rods can be engaged to alter the angle of the intake valve disc.

FIG. 8 shows an example method 800 for generating tumble in intake air by changing an angle of an intake valve disc of an intake valve to create an asymmetrical opening for intake airflow into a combustion chamber of an engine. In one example, the angle of the intake valve disc 202 of the intake valve 200 may be regulated based on engine operating conditions to generate desired tumble. In one example, length of the first rod 212 may be changed to vary the position of the annulus tumble guide 208 to generate the desired tumble based on engine load. In another example, length of the second rod 214 may be changed to vary the position of the annulus tumble guide 208 to generate the desired tumble based on engine load, as discussed above with reference to FIGS. 2-7B. The fuel injector 280 and along with a spark plug may be positioned on the right of the intake valve 200, as illustrated in FIG. 2.

Instructions for carrying out method 800 and the rest of the methods included herein may be executed by a controller (such as controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, such as the actuators 221 and 222 to regulate the length of the first rod 212 and the second rod 214 of FIGS. 2-7B to generate tumble, according to the methods described below.

The method 800 begins at 802, which comprises estimating and/or measuring engine operating conditions. Engine operating conditions may include but may not be limited to engine speed, engine temperature, engine load, torque demand, throttle plate position, intake valve position, exhaust valve position, fuel injector position, MAP, MAF, etc.

The method 800 proceeds to 804 to determine if engine cold start conditions are present. Determining cold start condition may include determining if the duration between the last engine-off condition and the current start condition is greater than a threshold duration. In some examples, a cold start condition may be determined by comparing an engine temperature to a threshold. For example, cold start conditions may be indicated if engine temperature is equal to ambient temperature and/or if engine temperature is below a threshold temperature. If engine cold start conditions are present, the method 800 proceeds to 806.

At 806, the length of one connect rod may be altered (extended or retracted) to push a segment of the annulus tumble guide at least partly outside the annulus channel. Pushing the segment of the annulus tumble guide may change the angle of the intake valve disc as the intake valve is being opened (moving downwards towards the combustion chamber) to flow intake air in an anti-clockwise direction into the combustion chamber at 808. The anti-clockwise flow of intake air may be towards the fuel injector positioned on the right of the intake valve. However, if the intake valve is on the left of the intake valve, the intake valve disc angle may be modulated differently to generate intake air to swirl clockwise towards the fuel injector.

In one example, as indicated at 809, the length of the first rod may be retracted to a minimum length to create the second angled position with an asymmetrical gap for intake airflow, as illustrated in FIGS. 6A-6B. The intake valve in the open position of FIG. 6A-6B may provide anti-clockwise tumble in intake air entering the combustion chamber, which may bring more vaporized fuel from a fuel injector on the right side of the intake valve towards the spark plug and enhance air fuel mixing during fuel injection to reduce HC emission and engine misfire.

In another example, as indicated at 810, the length of the second rod may change to a minimum length as illustrated in FIG. 7A to create an asymmetrical opening for anti-clockwise flow of intake air into the combustion chamber.

The method 800 proceeds to 812, where the intake air with the tumble and swirl mixes with fuel injected in the combustion chamber. The method 800 then returns.

If at 804, engine cold start condition is not present, the method 800 proceeds to 814, and determines if engine load is less than a first threshold. Engine load may be less than the first threshold, for example, when the engine load is less than 30% of maximum rated engine load. In one example, if engine load is less than the first threshold, it may reflect the throttle position is less open/more closed (for example, the throttle is 20% open). As such, when the throttle is less open, less airflow is provided to the engine than when the throttle is fully open or mostly open (for example, the throttle is 70% open), reflecting that the current engine load is less than the first threshold. If engine load is less than first threshold, the method 800 proceeds to 816, where the first rod and the second rod are maintained at the default length so that the annulus tumble guide is inside the annulus channel around the circumference of the annulus tumble guide. No segment of the annulus tumble guide protrudes outside the annulus channel.

At 818, method 800 includes opening the intake valve by actuating the push rod coupled to the intake valve disc in the downward direction towards the combustion chamber. The intake valve moves beyond the intake valve seat and beyond the annulus channel in the cylinder head, and moves into the combustion chamber. A symmetrical gap around the intake valve disc opens to enable intake air to flow symmetrically from the intake port to the combustion chamber without generation of additional tumble and swirl, as illustrated in FIGS. 4A-4B. At 820, the intake air inside the combustion chamber mixes with fuel inside the combustion chamber. The air-fuel mixture in the combustion chamber is ignited to provide the desired power to meet the engine load demand. The method 800 then returns.

If the engine load is not less than the first threshold load at 814, for example, at high engine speeds when the throttle is more open, the method 800 proceeds to 822. At 822, the method determines if the engine load is less than a second threshold, where the second threshold is higher than the first threshold. The engine load may not be less than the second threshold at very high engine speed, where the throttle is wide open (for example, the throttle is 85% open). If the engine load is not less than the first threshold, the method 800 proceeds to 824, where the length of one connect rod is altered to push out a segment of the annulus tumble guide outside the annulus channel. The method proceeds to 826, where the angle of the intake valve disc is changed as the intake valve disc is being moved downward towards the combustion chamber to open the intake valve to flow intake air in clockwise direction into the combustion chamber.

In one example, as indicated at 827, the intake valve may be at the first angled position of FIG. 5A-5B, where the length of the first rod may be extended to change the angle of the intake valve disc by protruding the annulus tumble guide as described above. In the first angled open position, intake air will flow in an asymmetrical pattern in a clockwise direction into the combustion chamber to reduce fuel spray wall impingement and to enhance air-fuel mixing.

In one example, as indicated at 828, the intake valve may be at the fourth angled position of FIG. 7B. In the fourth angled position the length of the second rod may change to a minimum length as illustrated in FIG. 7B to create asymmetrical opening for clockwise flow of intake air into the combustion chamber. The method 800 proceeds to 830, where the intake air with the tumble and swirl mixes with fuel injected in the combustion chamber. The method 800 then returns.

Referring back to 822, if the engine load is less than the second threshold (that is engine load is not too high or too low and is between first threshold and second threshold), the method 800 proceeds to 832. At 832, the length of both the rods may be manipulated simultaneously for desired valve bottom surface angle at given time, which generates the desired to tumble ratio. The extension or retraction of the first rod and/or the second rod may result in pushing out of a segment of the annulus tumble guide out of the annulus channel. At 834, the angle of the intake valve disc may change to flow intake air with tumble and swirl into the combustion chamber. At 836, the method 800 mixes the intake air with the high tumble and swirl with fuel injected in the combustion chamber. The method 800 then returns.

In this way, tumble and swirl may be generated in intake air flowing into the combustion chamber by varying an angle of the intake valve disc. The angle of the intake valve disc may be changed by extending or retracting the length of one or more rods coupled to an annulus tumble guide to protrude the annulus tumble guide from the annulus channel. Changing the angle of the intake valve disc creates an asymmetrical opening for generating tumble and swirl in the intake air flowing into the combustion chamber.

The technical effect of creating an asymmetrical opening by changing an angle of the intake valve disc through extension or retraction of one or more rods coupled to the annulus tumble guide includes, generating tumble and swirl in intake air without coupling of additional swirl vanes and/or valves to the intake port and/or the intake valve. The tumble and swirl generated in the intake air by changing the angle of the intake valve disc enhances air fuel mixing in the combustion chamber without increasing the structural complexity of the intake port and/or the intake valve. An increase in air-fuel mixing ensures that less fuel deposited is along the walls of the combustion chamber, including during engine cold start, and more fuel is made available for ignition, thereby increasing fuel economy, improving emissions, along with generation of desired power output based on engine operating conditions.

An intake valve assembly, including a tumble guide movably housed in a channel of a cylinder head directly below a valve seat configured to interface with an intake valve coupled to a combustion chamber, and an actuator configured to move the tumble guide to establish contact with an intake valve disc of the intake valve to change an angle of the intake valve disc. A first example of the system includes, wherein the intake valve disc is coupled to a push rod at a movable joint. A second example of the system optionally includes the first example and further includes, wherein the tumble guide is an annulus tumble guide housed in an annulus channel, and further comprising a connect rod coupling the annulus tumble guide to the actuator, wherein at a default length of the connect rod, the annulus tumble guide is fully housed inside the annulus channel. A third example of the system optionally includes one or more of the first and second examples, and further includes wherein at the default length of the connect rod, an opening fluidically connecting an intake port to the combustion chamber directs symmetrical flow of intake air to the combustion chamber. A fourth example of the system optionally includes one or more of the first through the third examples, and further includes wherein at an extended length of the connect rod, a first segment of the annulus tumble guide protrudes at least partly out of the annulus channel towards the intake valve disc. A fifth example of the system optionally includes one or more of the first through the fourth examples, and further includes, wherein at the extended length of the connect rod, the first segment of the annulus tumble guide comes in contact with the intake valve disc when the intake valve is actuated to an open position, changing the angle of the intake valve disc to create a first asymmetrical opening around the intake valve disc fluidically connecting to the combustion chamber. A sixth example of the system optionally includes one or more of the first through the fifth examples, and further includes, wherein at a retracted length of the connect rod, the first segment of the annulus tumble guide moves further back into the annulus channel, away from the intake valve disc, and a second segment of the annulus tumble guide protrudes at least partly outside the annulus channel towards the intake valve disc. A seventh example of the system optionally includes one or more of the first through the sixth examples, and further includes wherein at the retracted length of the connect rod, the second segment of the annulus tumble guide comes in contact with the intake valve disc when the intake valve is actuated to an open position, changing the angle of the intake valve disc to create a second asymmetrical opening around the intake valve disc fluidically connecting to the combustion chamber.

Another example system, comprising an intake valve including an intake valve disc coupled to a push rod, the intake valve configured to fluidically connect an intake port to a combustion chamber of an engine cylinder, a movable joint coupling the intake valve disc to the push rod, an annulus tumble guide housed movably in an annulus channel directly below a valve seat of a cylinder head, and at least one connect rod coupled to the annulus tumble guide, the annulus tumble guide configured to contact the intake valve disc to change an angle of the intake valve disc relative to an opening of the intake port. A first example of the system, further comprising a controller with computer readable instructions stored on non-transitory memory to retract the at least one connect rod to a first length to connect a first segment of the annulus tumble guide to a bottom surface of the intake valve disc to generate anti-clockwise intake air flow into the combustion chamber responsive to engine cold start. A second example of the system optionally includes the first example and further includes, wherein the controller includes further instructions to extend the at least one connect rod to a second length, to connect a second segment, opposite the first segment of the annulus tumble guide to the bottom surface of the intake valve disc to generate clockwise intake air flow into the combustion chamber responsive to an engine load above a threshold. A third example of the system optionally includes one or more of the first and second examples, and further includes wherein the controller includes further instructions to maintain the at least one connect rod at a third length to keep the annulus tumble guide housed inside the annulus channel responsive to the engine load below the threshold. A fourth example of the system optionally includes one or more of the first through the third examples, and further includes wherein the third length is less than the second length and is more than the first length.

An example method, comprising adjusting an angle of an intake valve disc of an intake valve relative to a push rod of the intake valve based on engine operating parameters to adjust an opening for flowing intake air into a combustion chamber. A first example of the method wherein adjusting the angle of the intake valve disc comprises extending a connect rod coupled to an annulus tumble guide responsive to an engine load above a threshold to move a first segment of the annulus tumble guide at least partly outside an annulus channel towards the intake valve disc. A second example of the method optionally includes the first example and further includes adjusting the angle of the intake valve disc further comprises opening the intake valve to move the intake valve disc in contact with the first segment of the annulus tumble guide to change the angle of the intake valve disc, thus adjusting the opening to a first asymmetrical opening for clockwise intake air flow into the combustion chamber. A third example of the method optionally includes the first through the second examples, and further comprising adjusting the angle of the intake valve disc comprises retracting the connect rod responsive to engine at cold start to move the first segment of the annulus tumble guide away from the intake valve disc further into the annulus channel, and to move a second segment of the annulus tumble guide at least partly outside the annulus channel, towards the intake valve disc.

A fourth example of the method optionally includes the first through the third examples, and further comprising adjusting the opening to a second asymmetrical by connecting the second segment of the annulus tumble guide to the intake valve disc to change the angle of the intake valve disc while opening the intake valve for anti-clockwise intake air flow into the combustion chamber. A fifth example of the method optionally includes the first through the fourth examples, and further comprising further comprising maintaining a length of the connect rod to maintain the annulus tumble guide housed inside the annulus channel responsive to the engine load less than the threshold. A sixth example of the method optionally includes the first through the fifth examples, and further comprising adjusting the opening to a symmetrical opening by maintaining the annulus tumble guide inside the annulus cannel with no change in the angle of the intake valve disc while opening the intake valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake valve assembly, comprising:
   a tumble guide movably housed in a channel of a cylinder head positioned below a valve seat configured to interface with an intake valve adapted to control flow of intake air to a combustion chamber; and
   an actuator configured to move the tumble guide to establish contact with an intake valve disc of the intake valve to change an angle of the intake valve disc.

2. The intake valve assembly of claim 1, wherein the intake valve disc is coupled to a push rod at a movable joint.

3. The intake valve assembly of claim 1, wherein the tumble guide is an annulus tumble guide housed in an annulus channel, and further comprising a connect rod coupling the annulus tumble guide to the actuator, wherein at a default length of the connect rod, the annulus tumble guide is fully housed inside the annulus channel.

4. The intake valve assembly of claim 3, wherein at the default length of the connect rod, when the intake valve is open, the intake valve and an intake port of the combustion chamber collectively form an opening fluidically connecting the intake port to the combustion chamber that directs symmetrical flow of intake air around the intake valve to the combustion chamber.

5. The intake valve assembly of claim 3, wherein at an extended length of the connect rod, a first segment of the annulus tumble guide protrudes at least partly out of the annulus channel towards the intake valve disc.

6. The intake valve assembly of claim 5, wherein at the extended length of the connect rod, the first segment of the annulus tumble guide comes in contact with the intake valve disc when the intake valve is actuated to an open position, changing the angle of the intake valve disc such that an intake port of the combustion chamber and the intake valve collectively form an opening fluidically connecting the intake port to the combustion chamber that directs asymmetrical flow of intake air around the intake valve disc to the combustion chamber.

7. The intake valve assembly of claim 5, wherein at a retracted length of the connect rod, the first segment of the annulus tumble guide moves further back into the annulus channel, away from the intake valve disc, and a second segment of the annulus tumble guide protrudes at least partly outside the annulus channel towards the intake valve disc.

8. The intake valve assembly of claim 7, wherein at the retracted length of the connect rod, the second segment of the annulus tumble guide comes in contact with the intake valve disc when the intake valve is actuated to an open position, changing the angle of the intake valve disc such that an asymmetrical flow of intake air flows around the intake valve disc to the combustion chamber.

9. A method, comprising:
   adjusting an angle of an intake valve disc of an intake valve relative to a push rod of the intake valve based on engine operating parameters by extending a connect rod coupled to an annulus tumble guide to move a first segment of the annulus tumble guide at least partly outside an annulus channel towards the intake valve disc to adjust a flow of intake air into a combustion chamber.

10. The method of claim 9, wherein the angle of the intake valve disc is adjusted responsive to an engine load above a threshold.

11. The method of claim 10, wherein adjusting the angle of the intake valve disc further comprises opening the intake valve to move the intake valve disc in contact with the first segment of the annulus tumble guide to change the angle of the intake valve disc, thus adjusting the flow of intake air to be asymmetrical and in a first direction around the intake valve.

12. The method of claim 10, wherein adjusting the angle of the intake valve disc comprises retracting the connect rod responsive to an engine cold start to move the first segment of the annulus tumble guide away from the intake valve disc further into the annulus channel, and to move a second segment of the annulus tumble guide at least partly outside the annulus channel, towards the intake valve disc.

13. The method of claim 12, further comprising adjusting the angle of the intake valve disc by contacting the intake valve disc with the second segment of the annulus tumble guide while opening the intake valve, thus adjusting the flow of intake air to be asymmetrical and in a second direction around the intake valve.

14. The method of claim 10, further comprising maintaining a length of the connect rod to maintain the annulus tumble guide housed inside the annulus channel responsive to the engine load less than the threshold.

15. The method of claim 14, further comprising flowing intake air in a symmetrical manner around the intake valve by maintaining the annulus tumble guide inside the annulus channel with no change in the angle of the intake valve disc while opening the intake valve.

16. A system, comprising:
   an intake valve including an intake valve disc coupled to a push rod, the intake valve configured to fluidically connect an intake port to a combustion chamber of an engine cylinder;
   a movable joint coupling the intake valve disc to the push rod;
   an annulus tumble guide housed movably in an annulus channel below a valve seat of a cylinder head; and
   at least one connect rod coupled to the annulus tumble guide, the annulus tumble guide configured to contact the intake valve disc to change an angle of the intake valve disc relative to an opening of the intake port.

17. The system of claim 16, further comprising a controller with computer readable instructions stored on non-transitory memory to retract the at least one connect rod to a first length to connect a first segment of the annulus tumble guide to a bottom surface of the intake valve disc to generate intake air flow that flows in a first direction into the combustion chamber responsive to an engine cold start.

18. The system of claim 17, wherein the controller includes further instructions to extend the at least one connect rod to a second length, to connect a second segment of the annulus tumble guide to the bottom surface of the intake valve disc to generate intake air flow that flows in a second direction into the combustion chamber responsive to an engine load above a threshold.

19. The system of claim 18, wherein the controller includes further instructions to maintain the at least one connect rod at a third length to keep the annulus tumble guide housed inside the annulus channel responsive to the engine load below the threshold.

20. The system of claim 19, wherein the third length is less than the second length and is more than the first length.

\* \* \* \* \*